United States Patent
Liu et al.

(10) Patent No.: US 9,285,648 B2
(45) Date of Patent: Mar. 15, 2016

(54) ELECTRO-OPTICAL APPARATUS AND DRIVING METHOD THEREOF

(71) Applicant: SiPix Technology Inc., Taoyuan County (TW)

(72) Inventors: Nien-En Liu, Taoyuan County (TW); Kuo-Lung Fang, Taoyuan County (TW); Yao-Jen Hsieh, Taoyuan County (TW)

(73) Assignee: SiPix Technology Inc., Taoyuan (TW)

( * ) Notice: Subject to any disclaimer, the term of this patent is extended or adjusted under 35 U.S.C. 154(b) by 0 days.

(21) Appl. No.: 14/185,865

(22) Filed: Feb. 20, 2014

(65) Prior Publication Data

US 2015/0098122 A1    Apr. 9, 2015

(30) Foreign Application Priority Data

Oct. 9, 2013  (TW) .............................. 102136564 A

(51) Int. Cl.
*G02B 26/00* (2006.01)
*G02F 1/167* (2006.01)
*G02F 1/1333* (2006.01)
*G02F 1/133* (2006.01)

(52) U.S. Cl.
CPC ............ *G02F 1/167* (2013.01); *G02F 1/13338* (2013.01); *G02F 2001/13324* (2013.01); *G02F 2001/1672* (2013.01); *G02F 2001/1676* (2013.01)

(58) Field of Classification Search
CPC ............ G02F 1/167; G02F 9/30; G09G 3/344
USPC .......... 359/296, 245, 265–275; 345/107, 105; 349/1, 19, 193
See application file for complete search history.

(56) References Cited

U.S. PATENT DOCUMENTS

| | | | |
|---|---|---|---|
| 5,041,824 A | 8/1991 | DiSanto et al. | |
| 6,738,039 B2 * | 5/2004 | Goden | 345/107 |
| 6,778,312 B2 * | 8/2004 | Kawai | G02F 1/167 |
| | | | 359/265 |
| 6,822,783 B2 * | 11/2004 | Matsuda et al. | 359/296 |
| 6,864,875 B2 | 3/2005 | Drzaic et al. | |
| 7,075,502 B1 | 7/2006 | Drzaic et al. | |
| 7,256,766 B2 | 8/2007 | Albert et al. | |

(Continued)

FOREIGN PATENT DOCUMENTS

| TW | 200419280 | 10/2004 |
|---|---|---|
| TW | 201142455 | 12/2011 |

OTHER PUBLICATIONS

"Office Action of Taiwan Counterpart Application", issued on Apr. 17, 2015, p. 1-p. 6.

*Primary Examiner* — Tuyen Tra
(74) *Attorney, Agent, or Firm* — Jianq Chyun IP Office

(57) ABSTRACT

An electro-optical apparatus including a first substrate, a second substrate disposed opposite to the first substrate, a display medium layer disposed between the first substrate and the second substrate, a first electrode disposed between the first substrate and the display medium layer, a second electrode disposed between the first substrate and the display medium layer and separated from the first electrode and a third electrode disposed between the display medium layer and the second substrate is provided. The display medium layer includes electrophoretic fluid and charged particles mixed into the electrophoretic fluid. Moreover, driving methods used to drive the electro-optical apparatus and another electro-optical apparatus are also provided.

8 Claims, 12 Drawing Sheets

(56) References Cited

U.S. PATENT DOCUMENTS

| | | |
|---|---|---|
| 7,492,505 B2 | 2/2009 | Liang et al. |
| 7,821,702 B2 | 10/2010 | Liang et al. |
| 8,111,234 B2 * | 2/2012 | Tokuyasu ................. 345/102 |
| 8,159,636 B2 | 4/2012 | Sun et al. |
| 2006/0290651 A1 | 12/2006 | Verhaegh et al. |
| 2007/0159678 A1 | 7/2007 | Verhaegh et al. |
| 2007/0220427 A1 * | 9/2007 | Briancon et al. ............. 715/700 |
| 2009/0146991 A1 | 6/2009 | Shimodaira et al. |
| 2011/0148218 A1 * | 6/2011 | Rozbicki .................... 307/104 |
| 2011/0248909 A1 | 10/2011 | Sato |
| 2011/0249043 A1 | 10/2011 | Sato |
| 2013/0033735 A1 | 2/2013 | Noh et al. |
| 2013/0201549 A1 * | 8/2013 | Mori ................ G02F 1/167 359/296 |

* cited by examiner

ELECTRO-OPTICAL APPARATUS AND DRIVING METHOD THEREOF

CROSS-REFERENCE TO RELATED APPLICATION

This application claims the priority benefit of Taiwan application serial no. 102136564, filed on Oct. 9, 2013. The entirety of the above-mentioned patent application is hereby incorporated by reference herein and made a part of this specification.

BACKGROUND OF THE INVENTION

1. Field of the Invention

The present invention relates to an electronic apparatus and driving method thereof. More particularly, the present invention relates to an electro-optical apparatus and a driving method thereof.

2. Description of Related Art

Recently, due to the continuous improvement of electro-optical technique, products such as electrophoretic electro-optical apparatuses, liquid crystal electro-optical apparatuses, plasma electro-optical apparatuses, organic light emitting diode electro-optical apparatuses are gradually commercialized and utilized in different sorts of occasions. For example, electrophoretic electro-optical apparatuses are often utilized in display application such as e-signage, e-tag, e-book, smart card and e-POP. Since the electrophoretic electro-optical technique has superior power-saving characteristics, electrophoretic electro-optical apparatuses can not only utilize as display, but also as a privacy window, comparing to other electro-optical apparatuses. However, there are performance problems such as slow switching speed and unable to switch between multiple transmittances and inconvenient to control or supply power when the conventional electrophoretic apparatuses are utilized as privacy windows.

SUMMARY OF THE INVENTION

The present invention provides a plurality of electro-optical apparatuses with superior performance.

The present invention provides a plurality of driving method of electro-optical apparatuses, which can cause the electro-optical apparatuses rapidly and accurately switch to the assigned mode.

An electro-optical apparatus of a embodiment of the present invention includes a first substrate, a second substrate disposed opposite to the first substrate, a display medium layer disposed between the first substrate and the second substrate, a first electrode disposed between the first substrate and the display medium layer, a second electrode disposed between the first substrate and the display medium layer and separated from the first electrode, a third electrode disposed between the display medium layer and the second substrate. The display medium layer includes electrophoretic fluid and a plurality of charged particles mixed into the electrophoretic fluid.

A driving method of an electro-optical apparatus of a embodiment of the present invention includes the flowing steps: applying a dispersing voltage which has the polarity that is opposite to the polarity of the charged particles to the second electrode in a period of time; in another period of time after the period of time, applying a first driving voltage and a second driving voltage which have the same polarity as the polarity of the charged particles to the first electrode and the second electrode and applying a third driving voltage which is opposite to the polarity of the charged particles to the third electrode.

Another driving method of the electro-optical apparatus of the embodiment of the present invention includes the flowing steps: in a period of time, applying a first dispersing voltage which has the polarity that is opposite to the polarity of the charged particles to the first electrode, applying a second dispersing voltage which has the polarity that is opposite to the polarity of the charged particles to the second electrode, and applying a third dispersing voltage which has the same polarity as the polarity of the charged particles to the third electrode; in another period of time after the period of time, applying a first driving voltage which has the polarity that is opposite to the polarity of the charged particles to the first electrode, applying a second driving voltage which has the same polarity as the polarity of the charged particles to the second electrode, and applying a third driving voltage which has the same polarity as the polarity of the charged particles to the third electrode.

An electro-optical apparatus of the embodiment of the present invention includes an electro-optical device and at least one of a power supply unit, a touch unit and a wireless control unit electrically connecting to the electro-optical device. The electro-optical device includes a first substrate, a display medium layer disposed on the first substrate and a first driving electrode disposed between the first substrate and the display medium layer and a second driving electrode disposed opposite to the first driving electrode. The display medium layer is disposed between the first driving electrode and the second driving electrode.

In an embodiment of the present invention, the third electrode completely covers the second substrate.

In an embodiment of the present invention, the first electrode includes a plurality of first branches, and the second electrode includes a plurality of second branches, while the first branches and the second branches are alternately arranged.

In an embodiment of the present invention, the first electrode further includes a first connecting part connected to the first branches, and the second electrode further includes a second connecting part connected to the second branches, while the first branches and the second branches are disposed between the first connecting part and the second connecting part.

In an embodiment of the present invention, the first electrode and second electrode disposed on the same film.

In one embodiment of the present invention, the electro-optical apparatus further includes a forth electrode. The forth electrode is disposed between the first substrate and the display medium layer and separated from the first electrode and the second electrode.

In an embodiment of the present invention, the forth electrode includes a plurality of forth branches. The first branches, the second branches and the forth branches are divided into a plurality of groups which are alternately arranged. Each of the groups includes one of the first branches, one of the forth branches, one of the second branches and another one of the forth branches in series.

In an embodiment of the present invention, the forth electrode further includes a plurality of forth connecting parts which connect the forth branches in series, and the first branches, the second branches, the forth branches and the forth connecting part are disposed between the first connecting part and the second connecting part.

In an embodiment of the present invention, each of the groups further includes one of the forth connecting part, and the forth connecting part connects one of the forth branches and another one of the forth branches which belong to the group.

In an embodiment of the present invention, the first electrode, the second electrode and the forth electrode disposed on the same film.

In an embodiment of the present invention, voltage won't be applied to the first electrode and the third electrode in the period of time.

In an embodiment of the present invention, the dispersing voltage is constant in the period of time.

In an embodiment of the present invention, the first driving voltage, the second driving voltage and the third driving voltage are constant in another period of time.

In an embodiment of the present invention, the absolute value of the first driving voltage and the second driving voltage are the same.

In an embodiment of the present invention, the absolute value of the first driving voltage, the second driving voltage and the third driving voltage are the same.

In an embodiment of the present invention, the absolute value of the dispersing voltage is smaller then the absolute value of the first driving voltage and the second driving voltage.

In an embodiment of the present invention, the absolute value of the first dispersing voltage is larger then the absolute value of the second dispersing voltage.

In an embodiment of the present invention, the absolute value of the third dispersing voltage is larger then the absolute value of the second dispersing voltage.

In an embodiment of the present invention, the absolute values of the third dispersing voltage and the first dispersing voltage are the same.

In an embodiment of the present invention, the first dispersing voltage, the second dispersing voltage and the third dispersing voltage are constant in the period of time.

In an embodiment of the present invention, the absolute value of the first driving voltage, the second driving voltage and the third driving voltage are the same.

In an embodiment of the present invention, the first driving voltage and the first dispersing voltage are the same, and the third driving voltage and the third dispersing voltage are the same.

In an embodiment of the present invention, the absolute value of the second dispersing voltage is smaller then the absolute value of the second driving voltage.

In an embodiment of the present invention, the first driving voltage, the second driving voltage and the third driving voltage are constant in another period of time.

In an embodiment of the present invention, the electro-optical apparatus includes the wireless control unit and the power supply unit. The wireless control unit is electrically connected to the power supply unit. The wireless control unit causes the power supply unit to supply power to the electro-optical device.

In an embodiment of the present invention, the power supply unit is a solar cell.

In one embodiment of the present invention, the electro-optical apparatus includes the wireless control unit. The wireless control unit causes an external power to supply power to the electro-optical device.

In one embodiment of the present invention, the electro-optical apparatus includes the touch unit. The touch unit controls the transmittance of the electro-optical device.

In light of above, by utilizing patterned designed electrodes (i.e., the first electrode and the second electrode), the electro-optical apparatus in an embodiment of the present invention can have multiple transmittances and superior performance. By utilizing the driving method of an electro-optical apparatus in an embodiment of the present invention, the electro-optical apparatus can rapidly and accurately switch to a shielding mode or a transparent mode and have superior performance. Besides, the wireless control unit of the electro-optical apparatus in another embodiment of the present invention can supply power to the electro-optical device with convenience, which eliminates the trouble of changing the battery of the electro-optical apparatus. The touch unit of the electro-optical apparatus in yet another embodiment of the present invention can easily control the transmittance of the electro-optical device and further improve the satisfaction while using.

To make the aforesaid features and advantages of the invention more comprehensible, several embodiments accompanied with drawings are described in details as follows.

DESCRIPTION OF EMBODIMENTS

Figure 1:
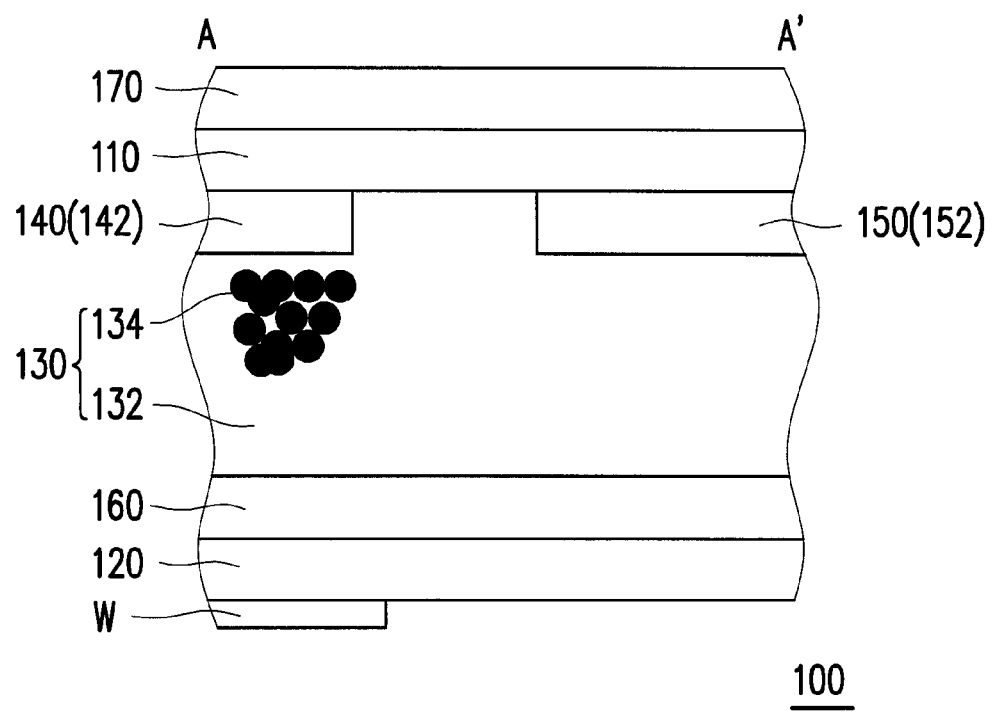
FIG. 1 is a cross-sectional view of an electro-optical apparatus according to one embodiment of the invention.
Figure 2:
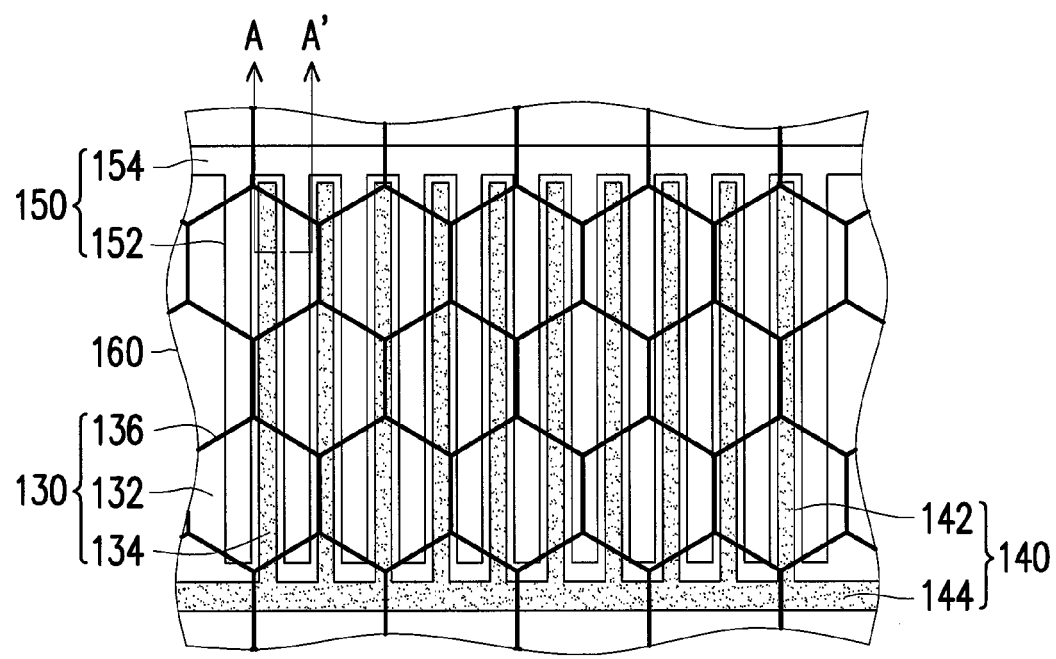
FIG. 2 is a top view of a first electrode, a second electrode, a third electrode and a display medium layer of an electro-optical apparatus according to an embodiment of the invention.

FIG. 1 is a cross-sectional view of an electro-optical apparatus according to one embodiment of the invention. FIG. 2 is a top view of a first electrode, a second electrode, a third electrode and a display medium layer of an electro-optical apparatus according to an embodiment of the invention. FIG. 1 is particularly corresponded to the line A-A' in FIG. 2. Please refer to FIG. 1 and FIG. 2, the electro-optical apparatus 100 of the embodiment of the invention includes a first substrate 110, a second substrate 120 disposed opposite to the first substrate 110, a display medium layer 130 disposed between the first substrate 110 and the second substrate 120, a first electrode 140 disposed between the first substrate 110 and the display medium layer 130, a second electrode 150 disposed between first substrate 110 and display medium layer 130 and separated from the first electrode 140, a third electrode 160 disposed between the display medium layer 130 and the second substrate 120. In this embodiment, the first electrode 140, the second electrode 150 and the third electrode 160 can be electrically insulated from each other. The third electrode 160 can be a completely patterned electrode. In other words, the third electrode 160 completely covers the second substrate 120. The display medium layer 130 includes electrophoretic fluid 132 and plurality of charged particles 134 mixed into the electrophoretic fluid 132. In this embodiment, the display medium layer 130 can include a plurality of micro-cup structures 136 connecting to each other, and each of the micro-cup structures 136 can contain a portion of the electrophoretic fluid 132 and a portion of the charged particles 134. Briefly, the display medium layer 130 of this embodiment can be a micro-cup electronic ink layer. However, the invention is not limited to the above descriptions. In other embodiments, the display medium layer 130 can also be other forms of electrophoretic display medium layer.

In this embodiment, the first electrode 140 includes a plurality of first branches 142, and the second electrode 150 includes a plurality of second branches 152. The first branches 142 and the second branches 152 can be alternately disposed. In particular, the first branches 142 and the second branches 152 can be alternately disposed along a direction parallel to the first substrate 110. The first electrode 140 of this embodiment further includes a first connecting part 144 connects the first branches 142. The second electrode 150 of this embodiment further includes a second connecting part 154 connects the second branches 152. The first branches 142 and the second branches 152 can be disposed between the first electrode 144 and the second electrode 154. In summary, the first electrode 140 can have a first comb shape, and the second electrode 150 can have a second comb shape, while one of the branches of the first comb shape can be inserted into two adjacent branches of the second comb shape. In this embodiment, the first electrode 140 and the second electrode 150 disposed on the same film. The first electrode 140 and the second electrode 150 can be form by the same etching process, so as to accurately control the shape, size and the forming position of the first electrode 140 and the second electrode 150. However, the invention is not limited to the above descriptions. In other embodiments, the first electrode 140 and the second electrode 150 can disposed on the different film layers, and the first electrode 140 and the second electrode 150 can also be form by laser cutting or other kinds of pattern processes.

The electro-optical apparatus 100 of this embodiment can be used as an optical valve. For example, the electro-optical apparatus 100 can be used as a privacy window. If the electro-optical apparatus 100 is used as a privacy window, the first substrate 110 and the second substrate 120 can be made of a transparent material, such as glass, plastic, and so forth. The electrophoretic fluid 132 of the display medium layer 130 can be transparent electrophoretic fluid. The charged particles 134 of the display medium layer 130 can be light shading charged particles such as black charged particles. The materials of the first electrode 140, the second electrode 150 and the third electrode 160 can be transparent material, such as indium tin oxide (ITO), indium zinc oxide (IZO), aluminum tin oxide (ATO), aluminum zinc oxide (AZO), indium germanium zinc oxide (IGZO) and so forth. However, the invention is not limited to the above descriptions. The choosing of the materials of the first substrate 110, the second substrate 120, the electrophoretic fluid 132, the charged particles 134, the first electrode 140, the second electrode 150 and the third electrode 160 can be depended on practical applications. Moreover, if the electro-optical apparatus 100 is used as a privacy window, the electro-optical apparatus 100 can further include a UV-blocking layer 170, so as to prevent the UV light from coming into buildings and further improve the function of the privacy window.

It is noted that the surface of the first electrode 140 can be smaller then the surface of the second electrode 150 in this embodiment. More particularly, each of the first branches 142 may have the surface smaller then the surface of second branches 152 If the electro-optical apparatus 100 is switched into transparent mode with this design, the charged particles 134 may be gather under the first electrode 140, which has the smaller surface, and therefore exposed the second electrode 150, which have the bigger surface, so as to cause the electro-optical apparatus 100 to have high transmittance. In the application of the privacy window, the electro-optical apparatus 100 can further include a white masking pattern W. The second substrate 120 can be disposed between the third electrode 160 and the white masking pattern W. The white masking pattern W can be aligned with the first electrode 140 along the direction that is perpendicular to the first substrate 110. If the electro-optical apparatus 100 switched into transparent mode, the white masking pattern W can cover the charged particle 134 that gathered under the first electrode 140, and users can hardly see the charged particle 134. Therefore, the appearance of the privacy window in the transparent mode can further approach the appearance of a normal transparent window, and the user will feel even more comfortable while using.

Figure 3:
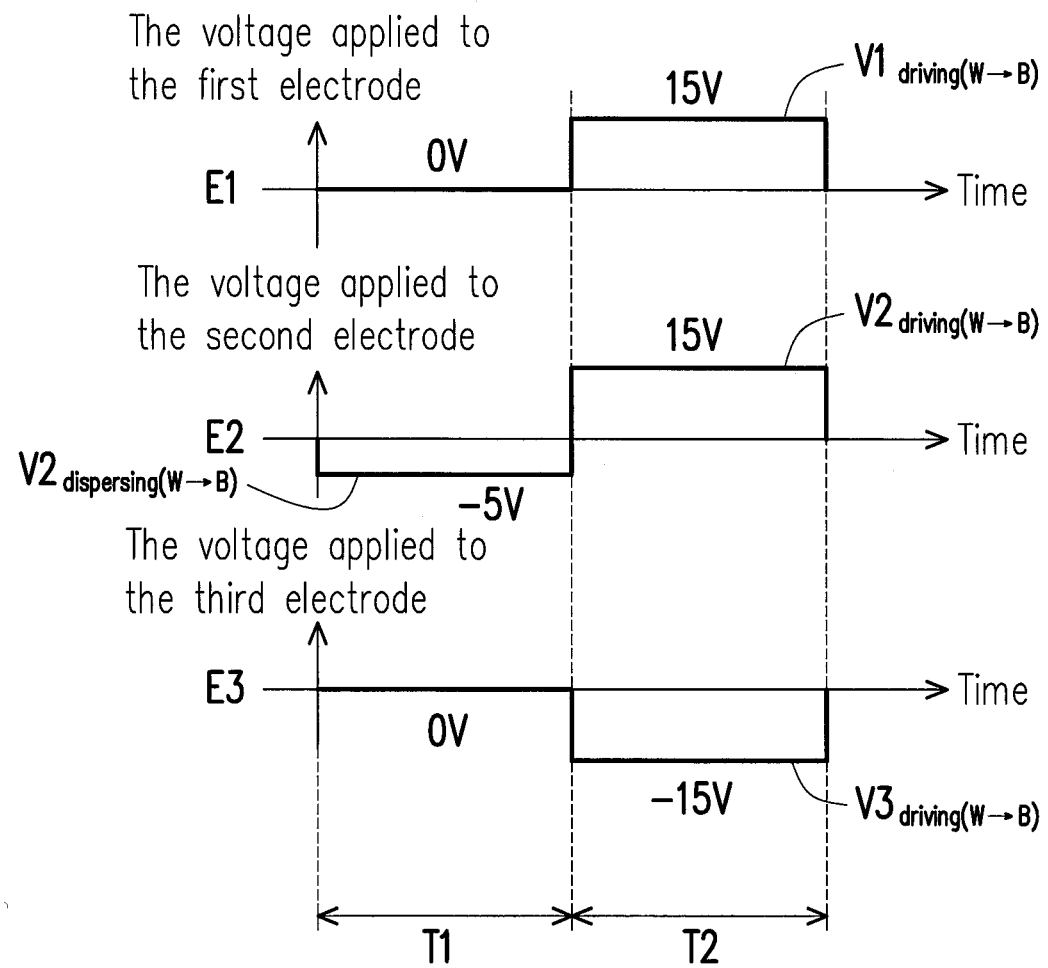
FIG. 3 illustrates a waveform of the voltage applied on an electro-optical apparatus while the electro-optical apparatus switches from a transparent mode to a shielding mode according to an embodiment of the invention.
Figure 4A:
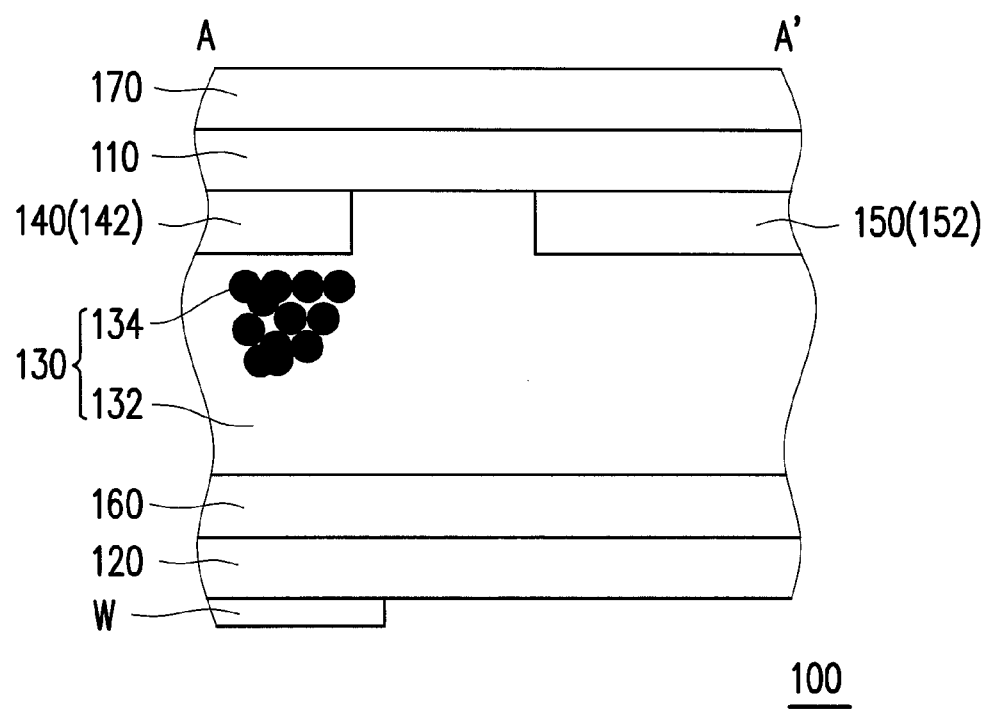
FIGS. 4A-4C illustrate the process of an electro-optical apparatus switching from a transparent mode to a shielding mode according to an embodiment of the invention.
Figure 4B:
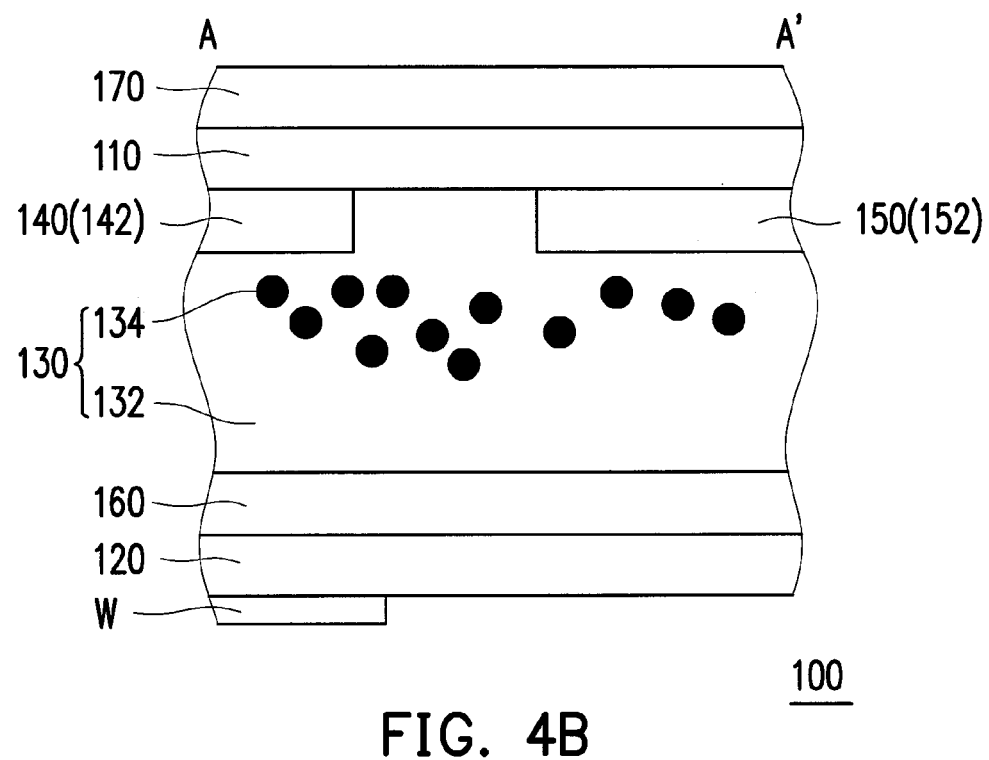
Figure 4C:
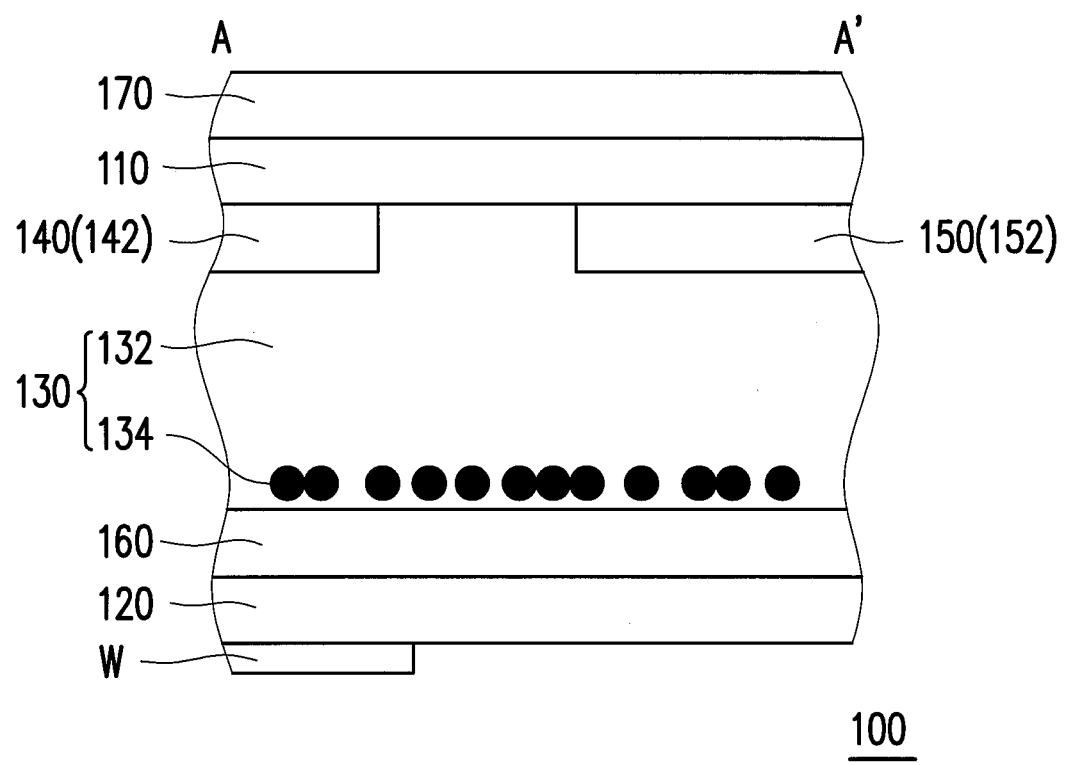

FIG. 3 illustrates a waveform of the voltage applied on an electro-optical apparatus while the electro-optical apparatus switches from a transparent mode to a shielding mode according to an embodiment of the invention. FIG. 4A-FIG. 4C illustrate the process of the electro-optical apparatus switching from a transparent mode to a shielding mode according to an embodiment of the invention. The transparent mode is a state that all charged particles 134 are gathered under the first electrode 140, and most of the light can penetrate the electro-optical apparatus 100. The shielding mode is a state that all charged particles 134 are completely covered the third electrode 160, and most of the light can't penetrate the electro-optical apparatus 100.

The driving method of switching the electro-optical apparatus 100 from transparent mode to shielding mode includes the following steps. Please refer to FIG. 3, FIG. 4A and FIG. 4B, in a period of time T1, applying dispersing voltage $V2_{dispersing(W \to B)}$, which has the polarity that is opposite to the polarity of the charged particles 134, to the second electrode 150. In this embodiment, the dispersing voltage $V2_{dispersing(W \to B)}$ can are constant in the period of time T1. For example, if the charged particles 134 have positive polarity, the polarity of the dispersing voltage $V2_{dispersing(W \to B)}$ can be fixed negative. While driving the electro-optical apparatus 100 according to the driving method above, the charged particles 134 which gathered under the first electrode 140 will be attracted by the second electrode 150 and gradually distribute from the first electrode 140 to the second electrode 150, as shown in FIG. 4A and FIG. 4B, and then distributed evenly on a side close to the first substrate 110. In this embodiment, the voltage may not be apply to the first electrode 140 and the third electrode 160 in the period of time T1, so that the first electrode 140 and the third electrode 160 won't easily influence the movement of the charged particles 134, so as to cause the charged particles 134 to distribute on the side close to the first substrate 110 more evenly.

Please refer to FIG. 3, FIG. 4B and FIG. 4C, the driving method includes following steps: in another period of time T2 following the period of time T1, applying a first driving voltage $V1_{driving(W \to B)}$ which has the same polarity as the polarity of the charged particles 134, and a second driving voltage $V2_{driving(W \to B)}$, which has the same polarity as the polarity of the charged particles 134, to the first electrode 140 and the second electrode 150 respectively and applying a third driving voltage $V3_{driving(W \to B)}$, which has the polarity opposite to the polarity of the charged particles 134, to the third electrode 160. While driving the electro-optical apparatus 100 according to the driving method above, the charged particles 134 which distributed on the side close to the first substrate 110 are being repelled by the first electrode 140 and the second electrode 150 and being attracted by the third electrode 160 as shown in FIG. 4B and FIG. 4C, and the charged particles 134 will uniformly move toward a side close to the second substrate 120, so as to completely cover the third electrode 160. When the charged particles 134 completely covered the third electrode 160, most of the light can hardly penetrate the electro-optical apparatus 100, and the electro-optical apparatus 100 stays in the shielding mode.

In this embodiment, the first driving voltage $V1_{driving(W \to B)}$, the second driving voltage $V2_{driving(W \to B)}$ and the third driving voltage $V3_{driving(W \to B)}$ can are constant in the period of time T2. The absolute value of the first driving voltage $V1_{driving(W \to B)}$ and the second driving voltage $V2_{driving(W \to B)}$ can be the same. The absolute value of the third driving voltage $V3_{driving(W \to B)}$ and the second driving voltage $V2_{driving(W \to B)}$ can also be the same. Additionally, in this embodiment, the absolute value of the dispersing voltage $V2_{dispersing(W \to B)}$ can be smaller then the absolute value of the first driving voltage $V1_{driving(W \to B)}$ and the second driving voltage $V2_{driving(W \to B)}$. The absolute value of the dispersing voltage $V2_{dispersing(W \to B)}$ can be smaller then the absolute value of the third driving voltage $V3_{driving(W \to B)}$. For example, the dispersing voltage $V2_{dispersing(W \to B)}$ can be −5 volts, the first driving voltage $V1_{driving(W \to B)}$ can be 15 volts, the second driving voltage $V2_{driving(W \to B)}$ can be 15 volts, and the third driving voltage $V3_{driving(W \to B)}$ can be −15 volts.

Figure 5:
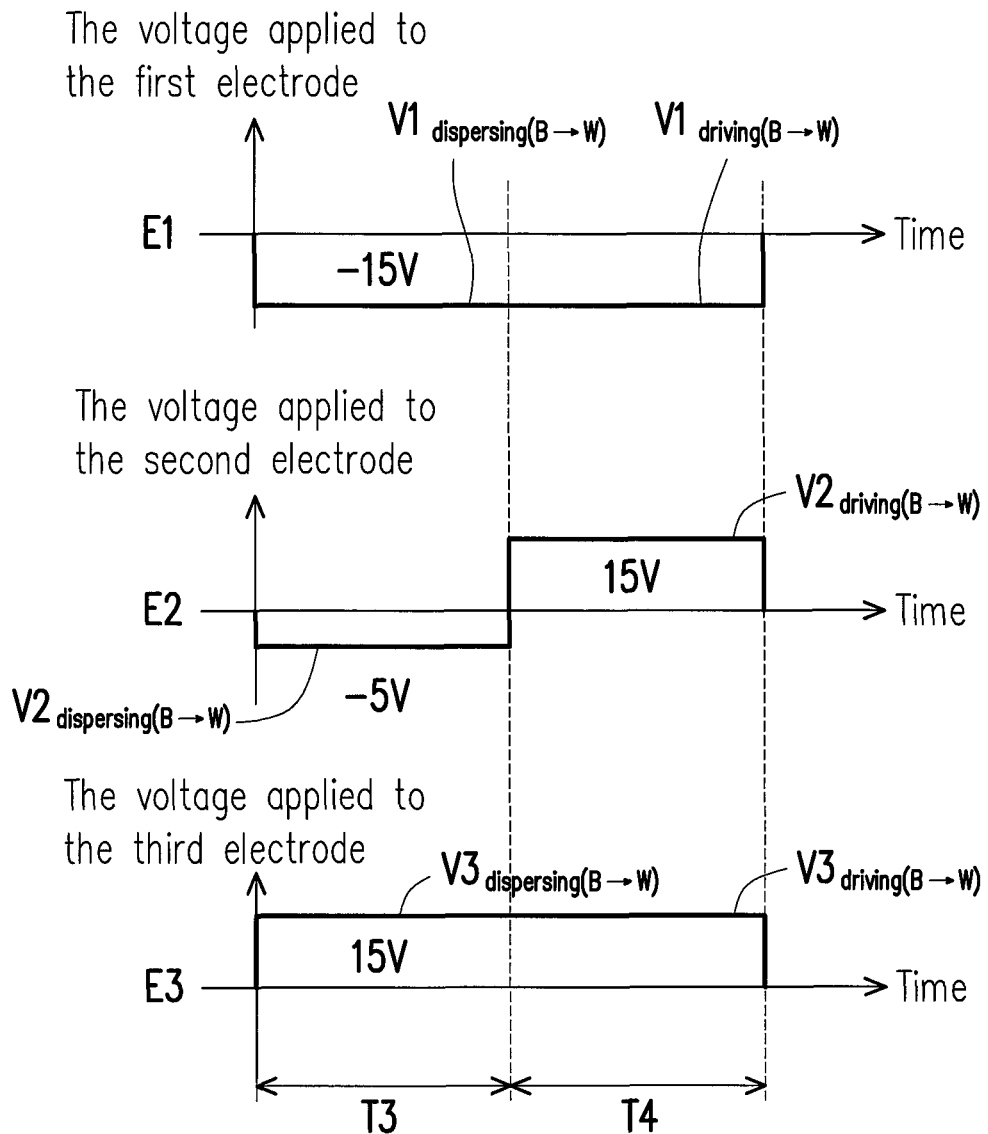
FIG. 5 illustrates a waveform of the voltage applied on an electro-optical apparatus while the electro-optical apparatus switches from a shielding mode to a transparent mode according to an embodiment of the invention.
Figure 6A:
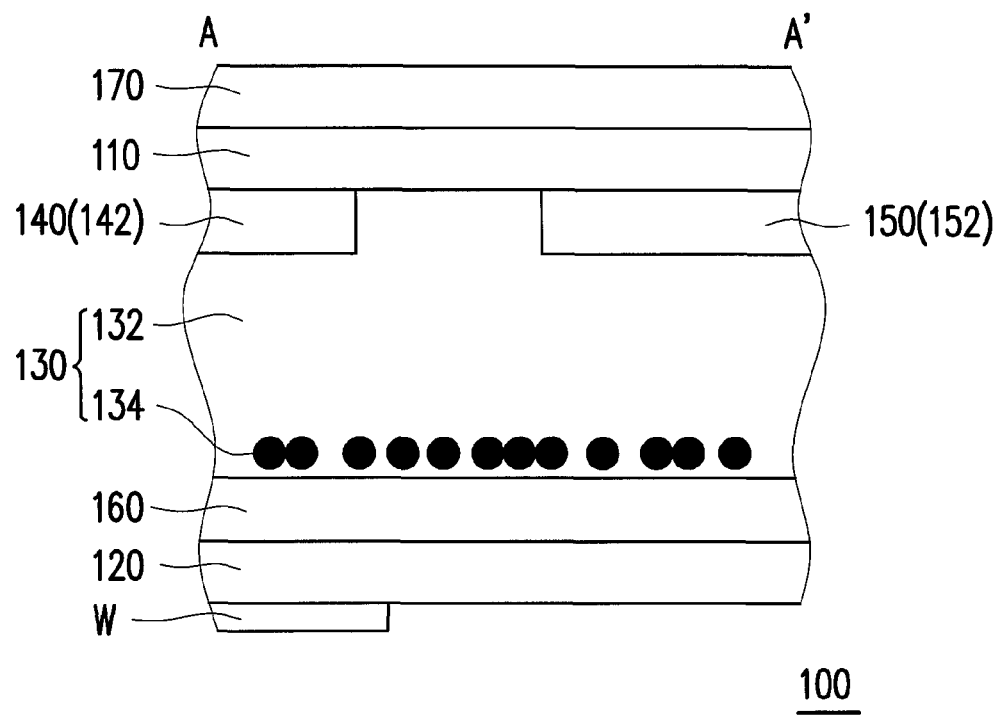
FIGS. 6A-6C illustrate the process of an electro-optical apparatus switching from a shielding mode to a transparent mode according to an embodiment of the invention.
Figure 6B:
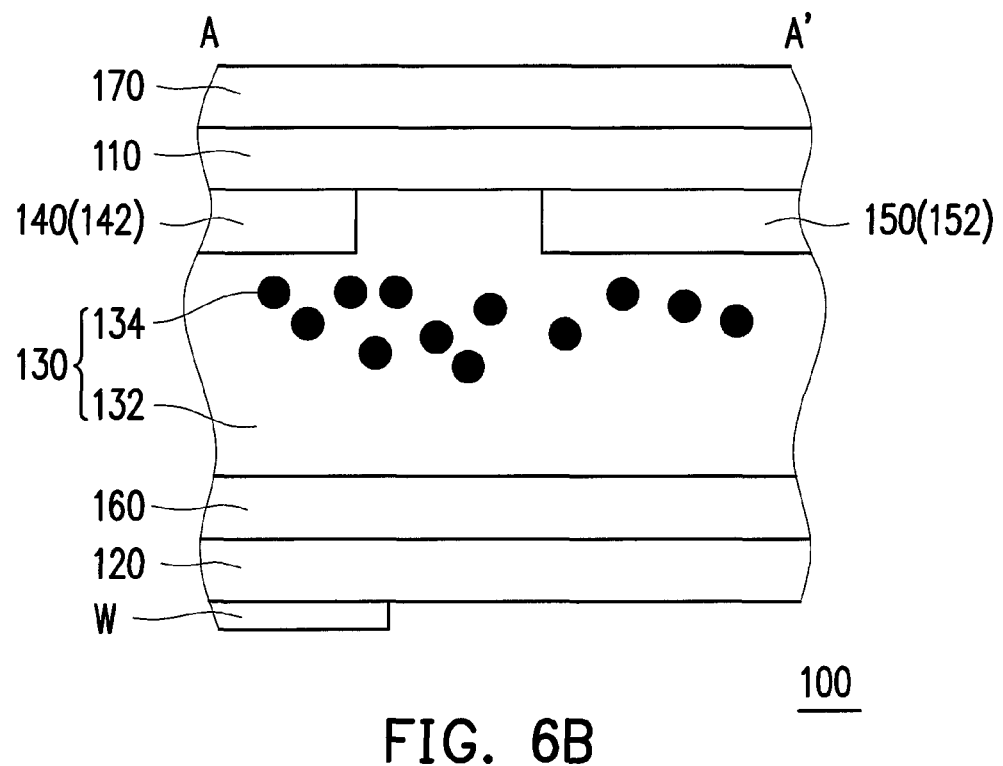
Figure 6C:
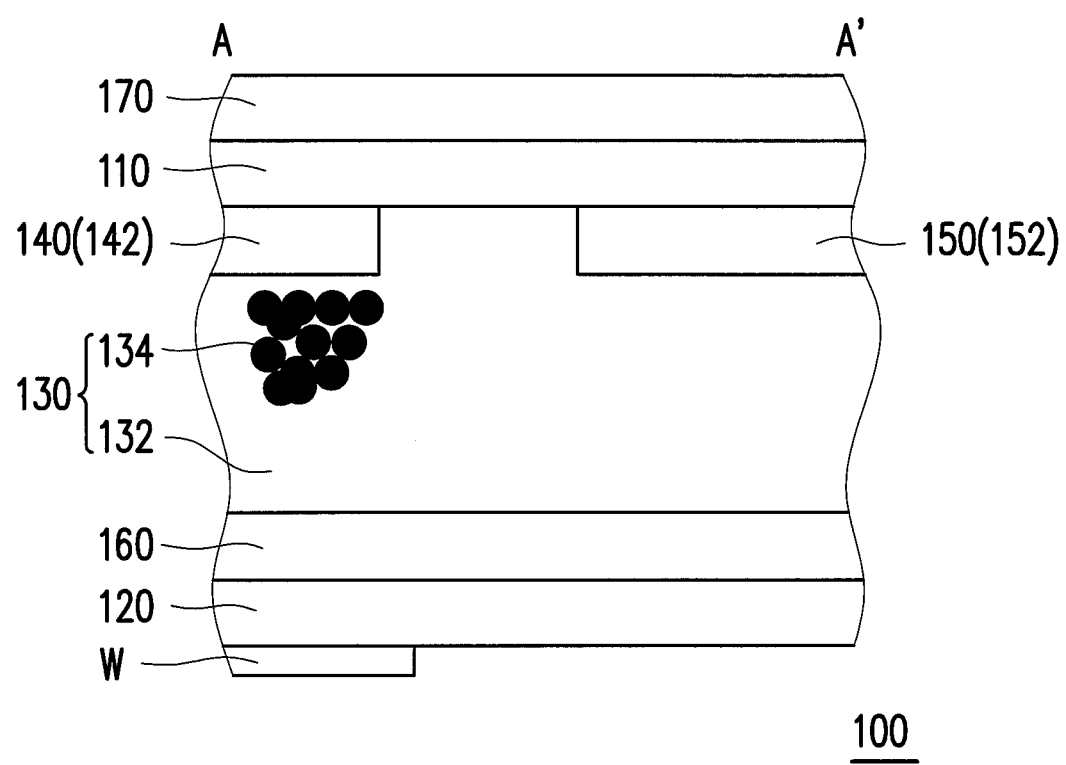

FIG. 5 illustrates a waveform of the voltage applied on an electro-optical apparatus while the electro-optical apparatus switches from a shielding mode to a transparent mode according to an embodiment of the invention. FIGS. 6A-6C illustrate the process of an electro-optical apparatus switching from a shielding mode to a transparent mode according to an embodiment of the invention. The driving method of switching the electro-optical apparatus 100 from shielding mode to transparent mode includes the following steps: please refer to FIG. 5, FIG. 6A and FIG. 6B, in a period of time T3, applying a first dispersing voltage $V1_{dispersing(B \to W)}$, which has the polarity opposite to the polarity of the charged particles 134, to the first electrode 140, applying a second dispersing voltage $V2_{dispersing(B \to W)}$, which has the polarity opposite to the polarity of the charged particles 134, to the second electrode 150 and applying a third dispersing voltage $V3_{dispersing(B \to W)}$, which has the same polarity as the polarity of the charged particles 134, to the third electrode 160. In this embodiment, the first dispersing voltage $V1_{dispersing(B \to W)}$, the second dispersing voltage $V2_{dispersing(B \to W)}$ and the third dispersing voltage $V3_{dispersing(B \to W)}$ can are constant in the period of time T3. While driving the electro-optical apparatus 100 according to the above driving method, the charged particles 134 which distributed on the side near the second substrate 120 will be repelled by the third electrode 160 and be attracted by the first electrode 140 and the second electrode 150, and moving towards a side close to the first substrate 110.

In this embodiment, the absolute value of the first dispersing voltage $V1_{dispersing(B \to W)}$ can be larger then the absolute value of the second dispersing voltage $V2_{dispersing(B \to W)}$, so as to cause the charged particles 134 to tend to distribute under the first electrode 140 during the process of moving the charged particles 134 toward the first substrate 110. In this embodiment, the absolute value of the third dispersing voltage $V3_{dispersing(B \to W)}$ can be larger then the absolute value of the second dispersing voltage $V2_{dispersing(B \to W)}$. The absolute value of the third dispersing voltage $V3_{dispersing(B \to W)}$ can be the same as the absolute value of the first dispersing voltage $V1_{dispersing(B \to W)}$. For example, the first dispersing voltage $V1_{dispersing(B \to W)}$ can be −15 volts, and the second dispersing voltage $V2_{dispersing(B \to W)}$ can be −5 volts, and the third dispersing voltage $V3_{dispersing(B \to W)}$ can be 15 volts.

Please refer to FIG. 5, FIG. 6B and FIG. 6C, the driving method includes the following steps: in the period of time T4 following the period of time T3, applying a first driving voltage $V1_{driving(W \to B)}$, which has the polarity opposite to the polarity of the charged particles 134, to the first electrode 140, applying a second driving voltage $V2_{driving(W \to B)}$ which has the same polarity as the polarity of the charged particles 134 to the second electrode 150 and applying a third driving voltage $V3_{driving(W \to B)}$, which has the same polarity as the polarity of the charged particles 134, to the third electrode 160. In this embodiment, the first driving voltage $V1_{driving(B \to W)}$, the second driving voltage $V2_{driving(B \to W)}$ and the third driving voltage $V3_{driving(B \to W)}$ can are constant in the period of time T4. While driving the electro-optical apparatus 100 according to the above driving method, the charged particles 134 which distributed on the side close to the first substrate 110 are being repel by the second electrode 150 and the third electrode 160 and being attract by the first electrode 140 as shown in FIG. 6B and FIG. 6C, and the charged particles 134 will move from the second electrode 150 to the first electrode 140, so as to completely distribute under the first electrode 140. At this moment, most of the light can penetrate the electro-optical apparatus 100, and the electro-optical apparatus 100 stays in the transparent mode.

In this embodiment, the absolute value of the first driving voltage $V1_{driving(B \to W)}$, the second driving voltage $V2_{driving(B \to W)}$ and the third driving voltage $V3_{driving(B \to W)}$ can be the same. The first driving voltage $V1_{driving(B \to W)}$ and the first dispersing voltage $V1_{dispersing(B \to W)}$ can be the same, and the third driving voltage $V3_{driving(B \to W)}$ and the third dispersing voltage $V3_{dispersing(B \to W)}$ can be the same. The absolute value of the second dispersing voltage $V2_{dispersing(B \to W)}$ can be smaller then the absolute value of the second driving voltage $V2_{driving(B \to W)}$. For example, the first driving voltage $V1_{driving(B \to W)}$ can be −15 volts, the second driving voltage $V2_{driving(B \to W)}$ can be 15 volts, and the third driving voltage $V3_{driving(B \to W)}$ be 15 volts.

By utilizing the waveform of the driving method above, the electro-optical apparatus 100 of this embodiment can rapidly and accurately switching from the transparent mode to the shielding mode, and the electro-optical apparatus 100 can operate in two different transmittances. However, the invention is not limited to descriptions above. In other embodiments, the electro-optical apparatus can operate in two different transmittances by disposing even more electrodes between the first substrate 110 and display medium layer 130. The following description refers to FIG. 7 and FIG. 8.

Figure 7:
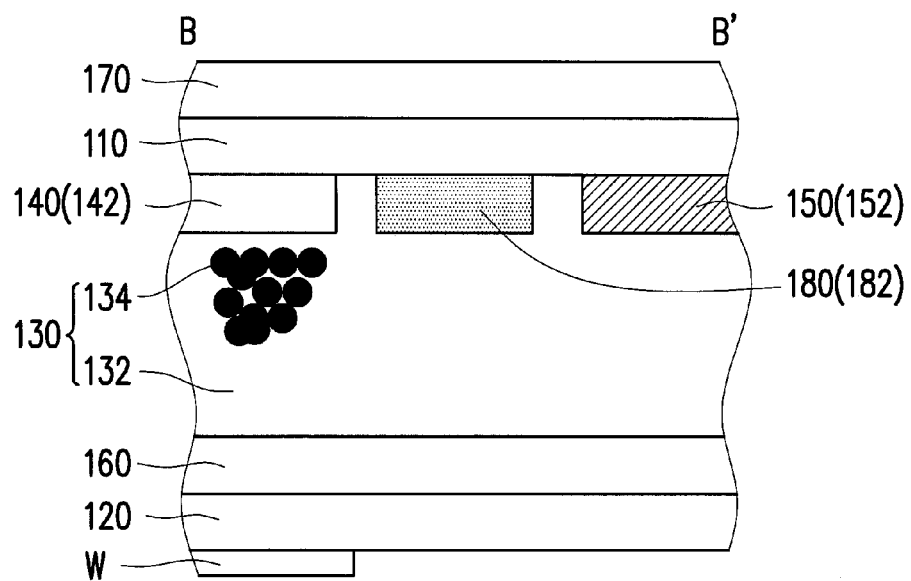
FIG. 7 is a cross-sectional view of an electro-optical apparatus according to another embodiment of the invention.

FIG. 7 is a cross-sectional view of an electro-optical apparatus according to another embodiment of the invention. FIG.

8 is a top view of a first electrode, a second electrode, a third electrode and a display medium layer of the electro-optical apparatus in FIG. 7. FIG. 7 is particularly corresponded to the line B-B' in FIG. 8. Please refer to FIG. 7 and FIG. 8, the electro-optical apparatus 100A is similar to the electro-optical apparatus 100, and therefore the same components are labeled by the same reference numbers. The main difference between the electro-optical apparatus 100A and the electro-optical apparatus 100 is that the electro-optical apparatus 100A further includes a forth electrode 180 disposed between the first substrate 100 and the display medium layer 130 and separated from the first electrode 140 and the second electrode 150. In this embodiment, the first electrode 140, the second electrode 150 and the forth electrode 180 disposed on the same film. The first electrode 140, the second electrode 150 and the forth electrode 180 can be form by the same etching process, so as to accurately control the shape, size and the forming position of the first electrode 140, the second electrode 150 and the forth electrode 180. However, the invention is not limited to the above descriptions. In other embodiments, the first electrode 140, the second electrode 150 and the forth electrode 180 can disposed on different film layers, and the first electrode 140, the second electrode 150 and the forth electrode 180 can also be form by laser cutting or other kinds of pattern processes.

Figure 8:
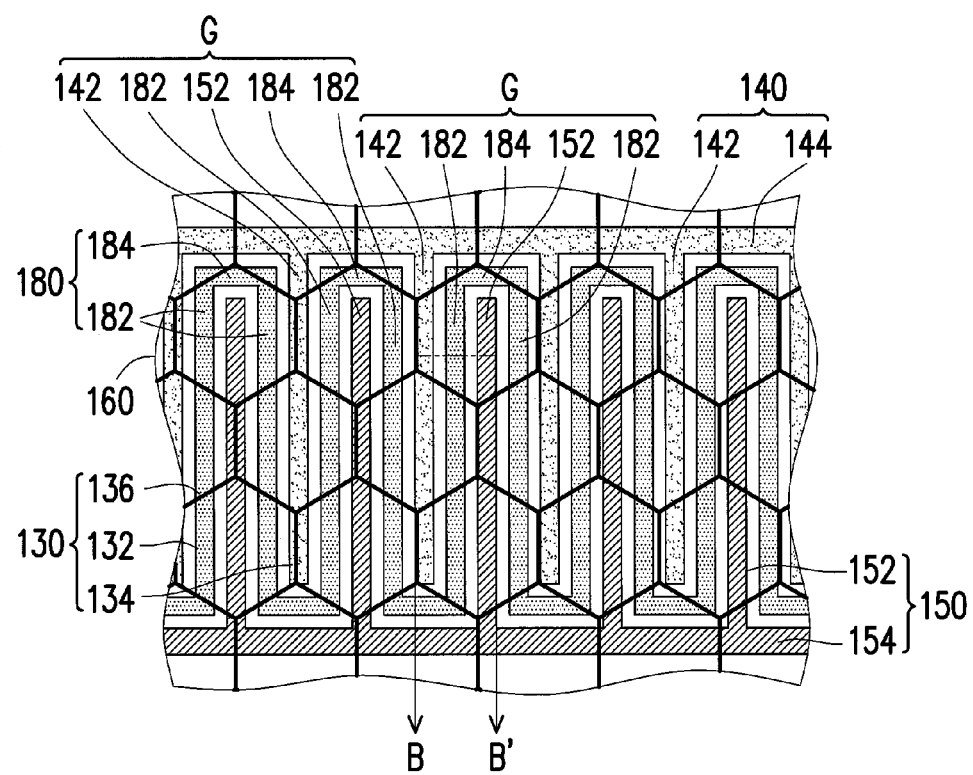
FIG. 8 is a top view of a first electrode, a second electrode, a third electrode and a display medium layer of the electro-optical apparatus in FIG. 7.
Figure 9A:
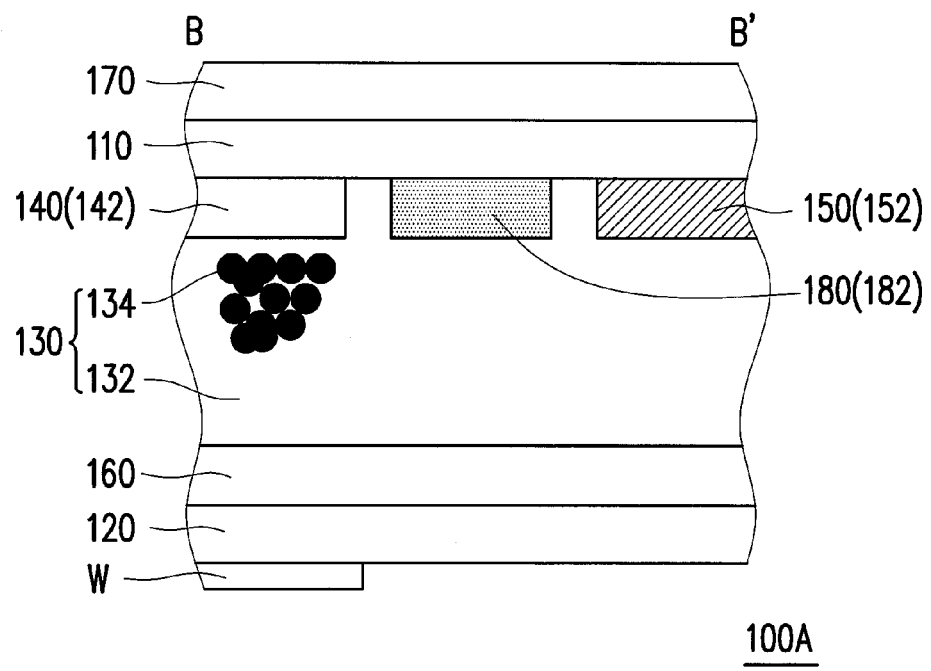
FIGS. 9A-9D illustrate an electro-optical apparatuses with multiple different transmittances according to another embodiment of the invention.
Figure 9B:
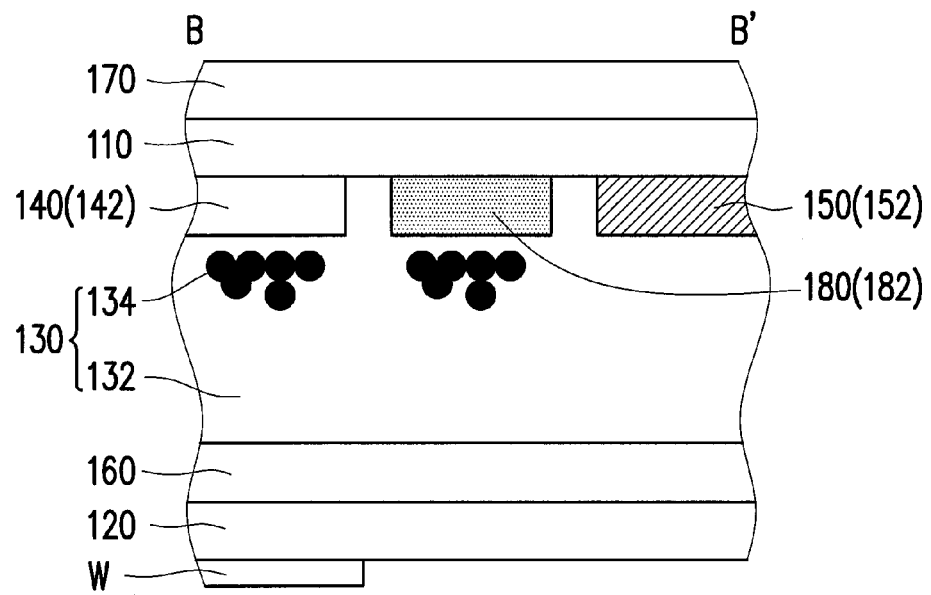
Figure 9C:
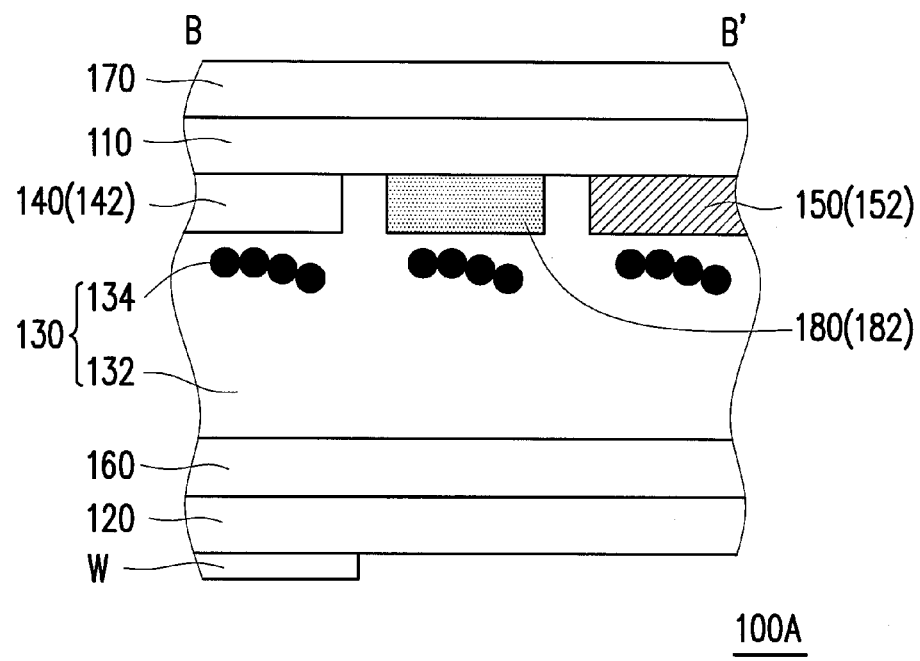
Figure 9D:
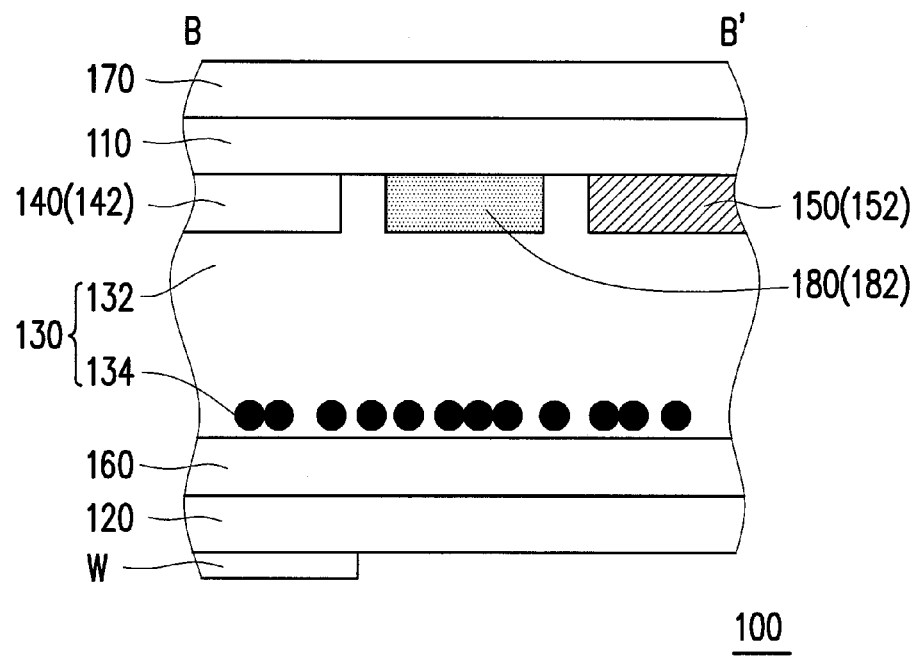

In this embodiment, the forth electrode 180 includes a plurality of forth branches 182. As shown in FIG. 8, the first branches 142, the second branches 152 and the forth branches 182 are divided into a plurality of groups which are alternately arranged. Each of the groups G includes one of the first branches 142, one of the forth branches 182, one of the second branches 152 and another one of the forth branches 182 in series. The forth electrode 180 further includes a plurality of forth connecting parts 184 connecting the forth branches 182 in series. The first branches 142, the second branches 152, the forth branches 182 and the forth connecting parts 184 can be disposed between the first connecting part 144 and the second connecting part 154. To be more specific, each of the groups G further includes a forth connecting part 184, and the forth connecting part 184 connects the forth branch 182 and the other forth branch 182 which belong to the group.

FIGS. 9A-9D illustrate an electro-optical apparatus operating in multiple different transmittances according to another embodiment of the invention. Please refer to FIG. 9A, the electro-optical apparatus 100A can cover the first electrode 140 with charged particles 134 and expose the second electrode 150 and the forth electrode 180. At this moment, the light can penetrate the portions where the second electrode 150 and the forth electrode 180 are disposed, so as to cause the electro-optical apparatus 100A to have the first transmittance. Please refer to FIG. 9B, the electro-optical apparatus 100A can cover the first electrode 140 and the forth electrode 180 with charged particles 134 and expose the second electrode 150. At this moment, the light can penetrate the electro-optical apparatus through the portions where the second electrode 150 is disposed, so as to cause the electro-optical apparatus 100A to have the second transmittance. Please refer to FIG. 9C, the electro-optical apparatus 100A can cover the first electrode 140, the second electrode 150 and the forth electrode 180 with charged particles 134 and expose the area between the first electrode 140, the second electrode 150 and the forth electrode 180, so as to cause the electro-optical apparatus 100A to have the third transmittance. Please refer to FIG. 9D, the electro-optical apparatus 100A can completely cover the first electrode 140, the second electrode 150, the third electrode 160, the forth electrode 180 and the area between the first electrode 140, the second electrode 150 and the forth electrode 180 with the charged particles 134, so as to cause the electro-optical apparatus 100A to have the forth transmittance. The first transmittance (i.e., 90%) is larger then the second transmittance (i.e., 60%), and the second transmittance is larger then the third transmittance (i.e., 30%), and the third transmittance is larger then the forth transmittance (i.e., 0%). However, the values of the first transmittance, the second transmittance, the third transmittance, the forth transmittance are not limited to the above values. With the proper design of the ratio of the surface of the first electrode 140, the second electrode 150 and the forth electrode 180 to the total surface of the electro-optical apparatus 100A, the electro-optical apparatus 100A can have the first transmittance, the second transmittance, the third transmittance and the forth transmittance which are intended to achieved.

Figures 10, 11:
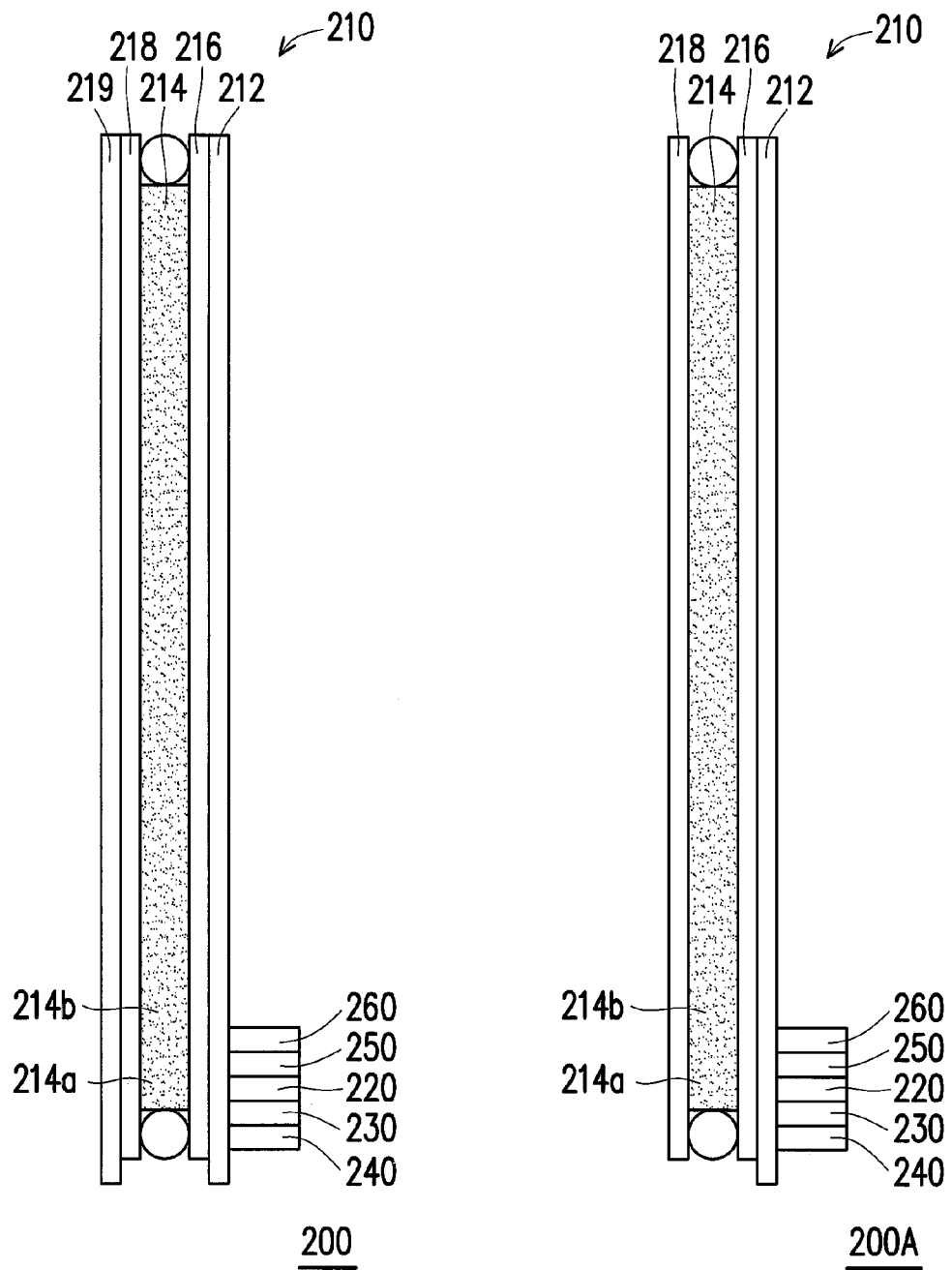
FIG. 10 is a schematic view of an electro-optical apparatus according to one embodiment of the invention.
FIG. 11 is a schematic view of an electro-optical apparatus according to another embodiment of the invention.

FIG. 10 is a schematic view of an electro-optical apparatus according to one embodiment of the invention. Please refer to FIG. 10, the electro-optical apparatus 200 of this embodiment can be used as an optical valve. For example, the electro-optical apparatus 200 of this embodiment can be used as a privacy window. The electro-optical apparatus 200 of this embodiment includes an electro-optical device 210 and at least one of a power supply unit 220, a touch unit 230 and a wireless control unit 240, which is electrically connected to the electro-optical device. The electro-optical device 210 includes a first substrate 212, a display medium layer 214 disposed on the first substrate 212 and a first driving electrode 216 disposed between the first substrate 212 and the display medium layer 214 and a second driving electrode 218 disposed opposite to the first driving electrode 216. The display medium layer 214 is disposed between the first driving electrode 216 and the second driving electrode 218. The second driving electrode 218 can include the first electrode 140 and the second electrode 150 in FIG. 1 or the first electrode 140, the second electrode 150 and the forth electrode 180 in FIG. 7. The first driving electrode 216 can be as the third electrode 160 in FIG. 1 or FIG. 7. In this embodiment, the display medium layer 214 can be an electrophoretic electronic ink layer, a cholesterol liquid crystal layer or other proper display medium layer.

In this embodiment, the display medium layer 214 includes electrophoretic fluid 214a and plurality of charged particles 214b mixed into the electrophoretic fluid 214a. The charged particles 214b can be black or other color. The electro-optical device 210 can control the movement of the charged particles 214b by utilizing the first driving electrode 216 and the second driving electrode 218, so as to achieve the ability to change the transmittance of the electro-optical device 210.

In this embodiment, the electro-optical apparatus 200 can further include a second substrate 219 which is opposite to the first substrate 212. The display medium layer 214, the first driving electrode 216 and the second driving electrode 218 are disposed between the first substrate 212 and the second substrate 219. However, the invention is not limited to the above description. FIG. 11 is a schematic view of an electro-optical apparatus according to another embodiment of the invention. Please refer to FIG. 11, the electro-optical apparatus 200A of the embodiment of the invention doesn't include the second substrate 219. The display medium layer 214, the first driving electrode 216 and the second driving electrode 218 of the electro-optical apparatus 200A can be exposed, and the user can easily remove and change.

Figure 12:
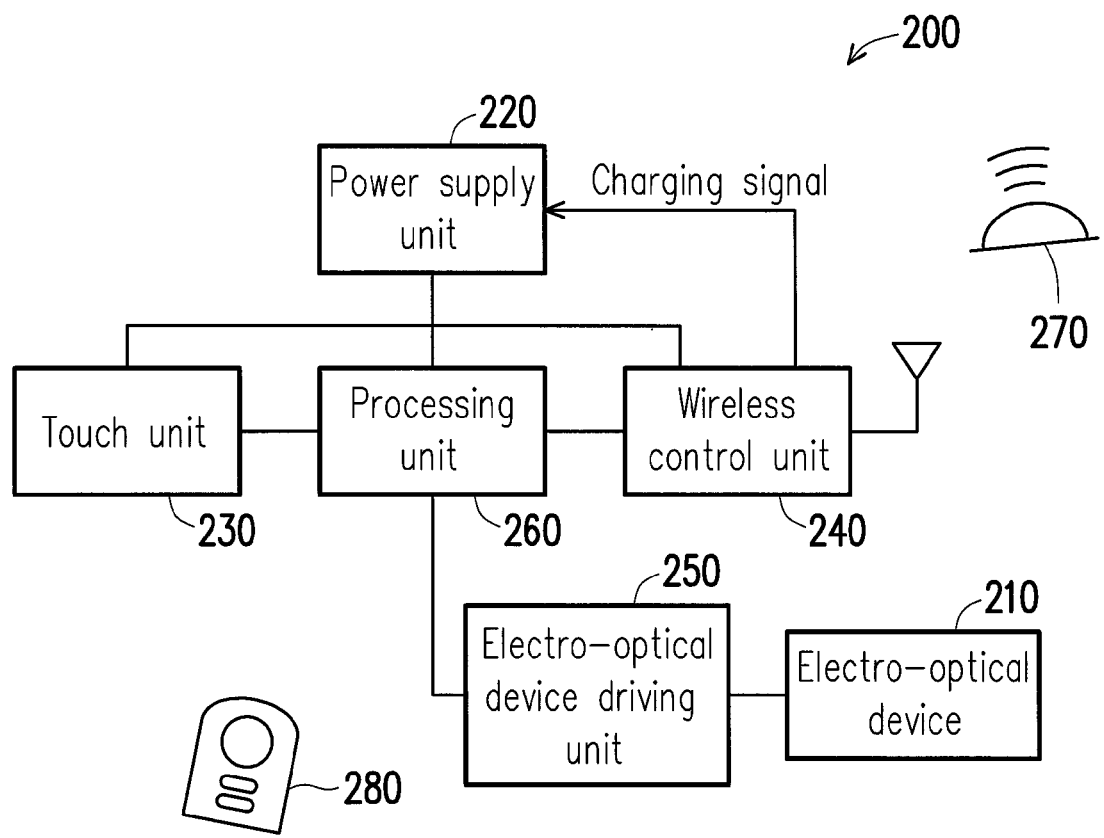
FIG. 12 is a circuit block diagram of an electro-optical apparatus according to one embodiment of the invention.

FIG. 12 is a circuit block diagram of an electro-optical apparatus according to one embodiment of the invention. Please refer to FIG. 12, an electro-optical apparatus 200 of this embodiment includes the wireless control unit 240 and the power supply unit 220. The wireless control unit 240 and the power supply unit 220 are electrically connected, and the wireless control unit 240 can receive wireless signals and cause the power supply unit 220 to supply power to the electro-optical device 210. More specifically, the electro-optical apparatus 200 further includes an electro-optical device driving unit 250 and a processing unit 260. At first, a wireless signal received by the wireless control unit 240 can transmit to the processing unit 260, and then the processing unit 260 is able to cause the electric-optical device driving unit 250 to supply power to the electro-optical device 210 after receiving the wireless signal, so as to drive the electro-optical device 210. In this embodiment, the power supply unit 220 can be a solar cell or other proper forms of batteries. However, the invention is not limited to the descriptions above. In other embodiments, the electro-optical apparatus 200 doesn't include the power supply unit 220, and an exterior power 270 can wirelessly offer the electro-optical device 210 power through the wireless control unit 240.

In this embodiment, the wireless control unit 240 not only can supply power to the electro-optical device 210, but also receive wireless data. More specifically, the wireless control unit 240 can have a plurality of channels, one of the channels can receive a charging signal from the exterior power 270 and wirelessly supply power to electro-optical device, and another channel can receive the data transmitted by an exterior signal source 280.

The electro-optical apparatus 200 of this embodiment further includes a touch unit 230. Through the touch unit 230, the user can easily control the transmittance of the electro-optical device 210. More specifically, when the user touch the touch unit 230, the touch unit 230 can send out touch signals. The processing unit 260 is able to cause the electro-optical device driving unit 250 to change the transmittance of the electro-optical device 210 after receiving the touch signals.

In summary, by utilizing patterned designed electrodes (i.e., the first electrode and the second electrode), an electro-optical apparatus in an embodiment of the invention can have multiple transmittances. Thus, if the electro-optical apparatus is applied as a privacy window, the user can adjust the transmittance of the privacy window according to the actual requirements.

Furthermore, by utilizing a driving method of an electro-optical apparatus in an embodiment of the invention, the electro-optical apparatus can rapidly and accurately switch to a shielding mode or a transparent mode and the user will feel even more comfortable while using.

Besides, a wireless control unit of an electro-optical apparatus in another embodiment of the invention can easily supply power to an electro-optical device, which eliminates the trouble of changing the battery of the electro-optical apparatus. Through a touch unit of the electro-optical apparatus, the transmittance of the electro-optical device can be easily adjusted.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electro-optical apparatus, comprising:
a first substrate;
a second substrate disposed opposite to the first substrate;
a display medium layer disposed between the first substrate and the second substrate, wherein the display medium layer comprises electrophoretic fluid and a plurality of charged particles mixed into the electrophoretic fluid;
a first electrode disposed between the first substrate and the display medium layer;
a second electrode disposed between the first substrate and the display medium layer, wherein the second electrode is separated from the first electrode;
a third electrode disposed between the display medium layer and the second substrate, wherein the third electrode completely covers the second substrate;
a forth electrode disposed between the first substrate and the display medium layer, wherein the forth electrode is separated from the first electrode and the second electrode, the first electrode comprises a plurality of first branches, and the second electrode comprises a plurality of second branches, and the forth electrode comprises a plurality of forth branches, the first branches, the second branches and the forth are divided into a plurality of groups which are alternately arranged, and each of the groups comprising one of the first branches, one of the forth branches, one of the second branches and another one of the forth branches in sequence.

2. The electro-optical apparatus as claimed in claim 1, wherein an area of the first electrode is smaller than an area of the second electrode.

3. The electro-optical apparatus as claimed in claim 1, wherein the first electrode comprises a plurality of first branches, and the second electrode comprises a plurality of second branches, the first branches and the second branches being alternately arranged.

4. The electro-optical apparatus as claimed in claim 3, wherein the first electrode further comprises a first connecting part connected to the first branches, and the second electrode further comprises a second connecting part connected to the second branches, the first branches and the second branches being disposed between the first connecting part and the second connecting part.

5. The electro-optical apparatus as claimed in claim 1, wherein the first electrode and the second electrode disposed on the same film.

6. The electro-optical apparatus as claimed in claim 1, wherein the first electrode further comprises a first connecting part connected to the first branches, and the second electrode further comprises a second connecting part connected to the second branches, and the forth electrode further comprises a plurality of forth connecting parts connected the forth branches in series, the first branches, the second branches, the forth branches and the forth connecting parts being disposed between the first connecting part and the second connecting part.

7. The electro-optical apparatus as claimed in claim 6, wherein each of the groups further comprises one of the forth connecting parts, the forth connecting part connecting to the forth branch of the group and the other forth branch of the group.

8. The electro-optical apparatus as claimed in claim 1, wherein the first electrode, the second electrode and the forth electrode disposed on the same film.

* * * * *